United States Patent [19]

Curtis

[11] Patent Number: 5,084,123
[45] Date of Patent: Jan. 28, 1992

[54] TEMPERATURE STABLE OPTICAL BONDING METHOD AND APPARATUS

[75] Inventor: Daniel L. Curtis, Manhattan Beach, Calif.

[73] Assignee: Hughes Aircraft Company, Los Angeles, Calif.

[21] Appl. No.: 546,650

[22] Filed: Jul. 2, 1990

[51] Int. Cl.⁵ .......................... B32B 1/06; B32B 31/06
[52] U.S. Cl. ...................................... 156/292; 156/84; 156/85; 156/290; 156/310; 156/99; 156/289; 156/537
[58] Field of Search ............... 156/290, 292, 310, 315, 156/289, 537, 99, 107, 84, 85; 248/467; 350/287, 253

[56] References Cited

U.S. PATENT DOCUMENTS

| | | | |
|---|---|---|---|
| 2,991,207 | 7/1961 | Miller | 156/99 |
| 3,616,043 | 10/1971 | Anderson et al. | 156/99 |
| 4,332,636 | 6/1982 | McLeod | 156/107 |
| 4,857,130 | 8/1989 | Curtis . | |

Primary Examiner—Michael W. Ball
Assistant Examiner—Francis J. Lorin
Attorney, Agent, or Firm—William J. Streeter; Wanda K. Denson-Low

[57] ABSTRACT

Optical elements (52, 54) are bonded to supports (58) by a resilient bonding agent (68) and a rigid bonding agent (78). The resilient bonding agent has the property of shrinking upon curing and is placed within a bonding space (66) defined by rails (64) of a rail assembly (56). Upon curing, the bonding agent shrinks and securely pulls the contacting surfaces (52b, 64a) of the element and the rails under tension of the bonding agent. A donut (80) of resilient material spaces the bonding agent from contact with or adjacent to the contacting surfaces (64a, 52b) so that, for a rail assembly and an optical element of significantly different coefficients of thermal expansion, temperature variations will not cause glass pieces to be pulled from the optical element. The base (62) of the rail assembly is also made thin to bend and provide relief upon contraction of the bonding agent rather than to unduly stress the optical element.

23 Claims, 2 Drawing Sheets

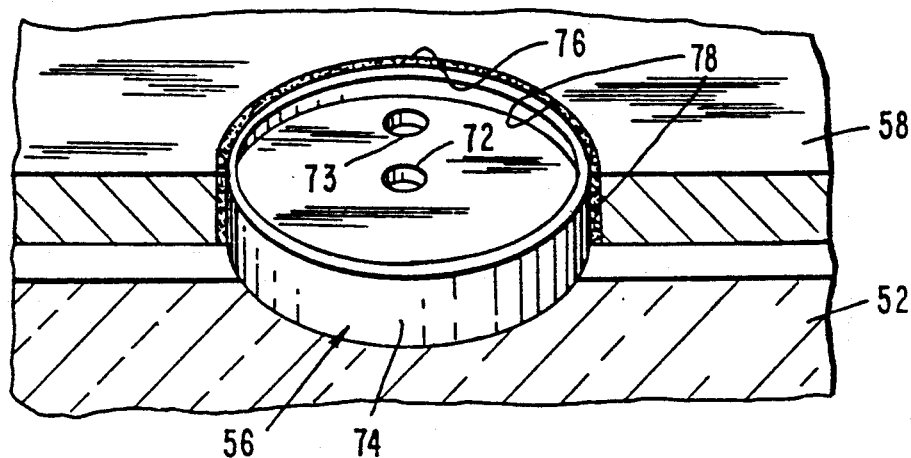
Fig. 6.
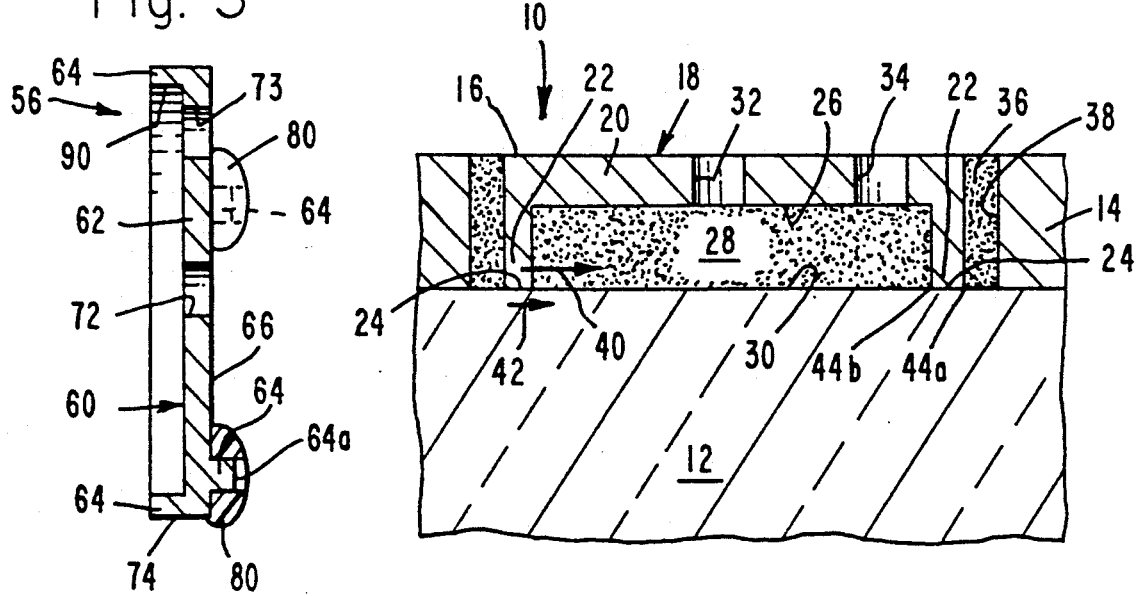
Fig. 3
Fig. 1. (PRIOR ART)

TEMPERATURE STABLE OPTICAL BONDING METHOD AND APPARATUS

BACKGROUND OF THE INVENTION

The present invention relates to an apparatus and method for bonding an optical element to a support and, more particularly, to such bonding which is unaffected by any differential coefficients of thermal expansion of the optical element, the support and the material bonding the element to the support.

Optical glass and like optical elements are conventionally bonded to a support by bonding materials. Typically, bonding materials have a coefficient of thermal expansion which is approximately ten times higher than that of the optical element of the substrate to which the element is bonded. As a consequence, temperature changes cause differential expansion of the bond and thereby result in optical shifts in the optical element. In addition, if the bond interface is not exactly uniform in thickness, the thicker part expands more than the thinner part, to create a wedge which results further in an optical shift.

Sometimes, even if the bond thicknesses are made precisely uniform throughout the bonding area, the bonding material buckles, which causes the optical element to tilt with respect to its support, and produce an optical shift.

Such thermally induced optical shifts are highly undesirable as causing optical misalignment in precise optical equipment.

One common method of minimizing such optical shifts and optical misalignment requires the selection of bonding materials which tend to minimize such shifts. In addition, the bond thickness is made as small as possible so that its effect to produce an optical shift is minimized. Finally, some techniques employ a boresight maneuver immediately prior to use of the equipment, first to measure the optical shift and then to correct it either electronically or physically by tilting mirrors, in order that the optical shift be nulled out. Such approaches significantly affect the overall cost and complexity of the system.

An additional problem occurs when a system includes two or more optical elements, for example, prisms, which are to be aligned one with respect to the other. Positioning of such multiple image prisms requires that each prism be positioned precisely with respect to other prisms. Conventionally, this requires some form of support and the attendant bonding of the prisms thereto. Such bonding techniques, such as referred to above, create difficulties in precise alignment. Typically, the prisms are aligned one with respect to the other in a holding fixture that includes supporting the prism frame. Once the prisms are correctly positioned with respect to the frame, the bondinq material is used to bond the prisms to the support structure. Because the prism surfaces are not necessarily parallel to the walls of the frame, the bond thickness will vary over the bond area, with the result that the prism aliqnment shifts with temperature as a result of the wedge and temperature buckling effects.

The invention described in U.S. Pat. No. 4,857,130 issued 15 Aug. 1989, and assigned to the same assignee of this document, is eminently successful in avoiding and overcoming the above and other problems. However, when aluminum, for example, was used as the rail material and the assembly was subjected to a low temperature such as $-70°$ F., it was discovered that glass was pulled and torn from the prism where the rail was bonded the prism, because of the differential coefficients of expansion of aluminum and glass.

A similar problem was observed with respect to the normal bond spot procedure, prior to the invention disclosed in above referenced U.S. Pat. No. 4,857,130, in which the differential expansion between the three materials, used with a bond spot, resulted in an increase in glass surface stress. The rail bond plug approach, disclosed in U.S. Pat. No. 4,857,130, added to the glass stress over the normal bond spot stress, due to the differential expansion between the bond epoxy and the linear expansion at the feet of the plug metal. Of even more importance, as found by experimentation, any lateral differential expansion between the optical glass element and the plug material of aluminum was prevented by the epoxy bridge formed at the bottom of each foot where it contacted the glass surface. This contact point normally would slip with temperature variation but the epoxy bridge, which has a modulus of over $10^6$ psi at $-70°$ F., prevented the slippage. This resulted in a build up of stress in the glass to a point where the glass fractured at the contact line of each metal foot and the optical surface.

Before the underlying cause of the glass breakage was determined, it was the prevailing theory of applicant that differential contraction between the rail plug foot material and the bond material was the cause for such fracture.

The initial approach to reducing the differential coefficient of thermal expansion of the material adjacent to the three feet of the bond plug was the addition of a low coefficient of thermal expansion filler to the epoxy. Reducing the overall coefficient of thermal expansion of the epoxy filler mixture by a factor of three, however, did not have any appreciable effect; about the same amount of glass pulling resulted when the assembly was subjected to the $-70°$ F. environment.

The aluminum plug was then replaced by one of steel, while using the same epoxy without filler. Although this modification was expected to increase the differential stress on the glass with the result of increased glass pulling, to the contrary, the result was exactly the opposite in that no glass was pulled even after the assembly was recycled 5 times to an environment of $-70°$ F.

The unexpected result, that the use of the steel plug did not cause glass pulling, provided the clue as to the true cause for the excessive stress build up on the glass, and suggested a solution which resulted in the present invention. The use of the steel allowed the coefficient of thermal expansion of the plug material and the glass to be essentially matched, resulting in a very small lateral strain motion of the base of each plug foot with respect to the glass at $-70°$ F. Because aluminum has a coefficient of thermal expansion of about twice that of glass, the differential expansion between these materials resulted in a much larger relative lateral strain motion. As the modulus of the epoxy approaches $10^6$ psi at $-70°$ F., the epoxy bridge between the base of each foot and the glass transforms the above strain into a glass stress with the result that aluminum plugs cause glass pulling and steel plugs do not.

Thus, the discovery of the cause of the glass pulling and the realization, that plugs of aluminum must be used to match the coefficient of thermal expansion of the prism support structure, provided the solution, as embodied in the present invention.

SUMMARY OF THE INVENTION

Accordingly, the present invention avoids and overcomes the above differential expansion problem by avoiding the placement of an epoxy adhesive, for example, immediately adjacent to the specific points of contact between the rails and the support. In the preferred embodiment of the present invention, a bead of elastomeric material is placed about each foot of the rail.

Otherwise, as disclosed in U. S. Pat. No. 4,857,130 the optical element rests firmly on the rails and is bonded to its support by a bonding agent, such as the epoxy adhesive, placed between the rails. The bonding agent is selected to have the property of shrinking upon curing, and is bonded directly to both the optical element and the support. Thus, the bonding agent not only bonds the optical element to the support but securely pulls the element into direct contact against the rails under tension of the agent. Therefore, the rails provide a precise, determinable spacing between the optical element and the support.

The rails may comprise two or more straight or curved risers, or a pan-like arrangement The latter pan-like arrangement can serve also as an intermediary attachment to a frame, with further bondinq material securing the pans to the frame. When pans are secured to two or more optical elements, the optical elements may be positioned with precise optical alignment with respect to each other in the same frame.

Several advantages are derived from the above construction. Optical elements are bonded to their support without glass pulling between it and its support, or misalignment resulting from temperature changes. A plurality of optical elements may be positioned precisely with respect to one another, without regard to any misalignments of their supporting frames.

Other aims and advantages, as well as a more complete understanding of the present invention, will appear from the following explanation of an exemplary embodiment and the accompanying drawings thereof.

DESCRIPTION OF THE DRAWINGS

FIG. 1 illustrates a rail structure disclosed in U.S. Pat. No. 4,857,310 and the stress forces exerted on the glass by varying differential coefficients of thermal expansion;

FIG. 3 depicts a cross-section of a rail assembly prior to behind placed in the optical assembly of FIG. 2;

FIG. 6 is an isometric top view of the rail assembly.

DETAILED DESCRIPTION OF THE INVENTION

Figure 2:
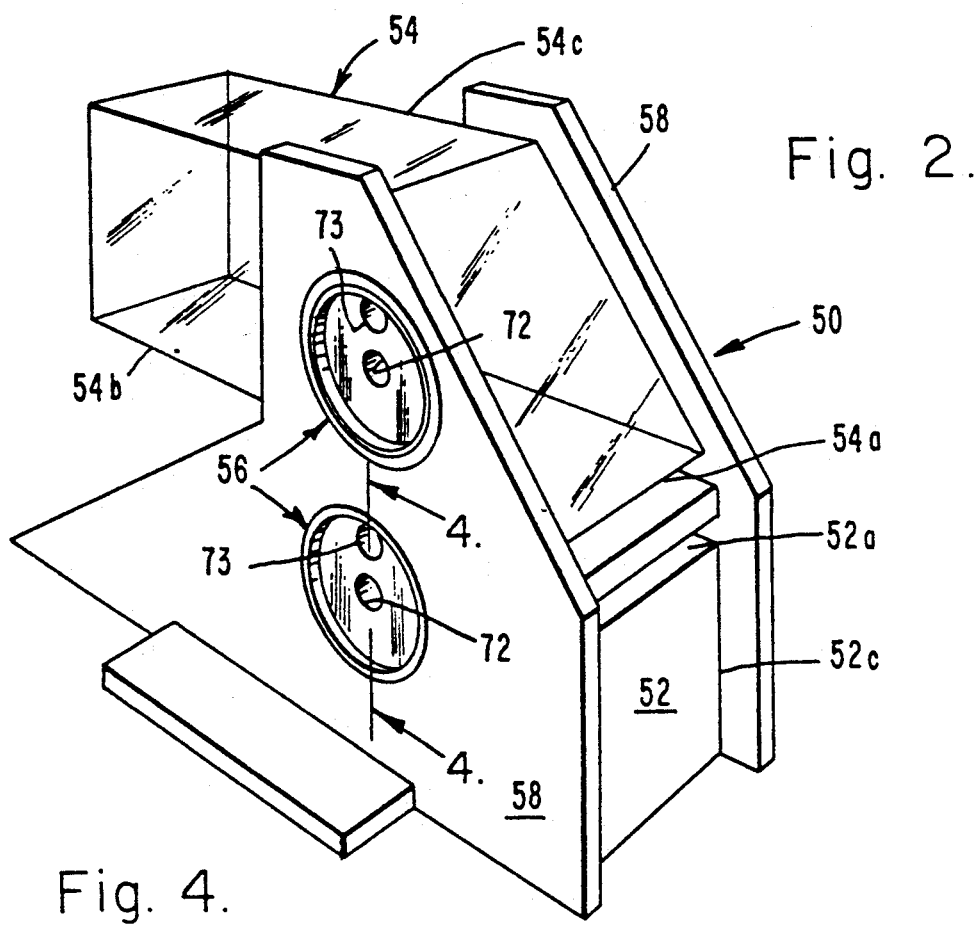
FIG. 2 illustrates an assembly for effecting a precise alignment of two prisms in accordance with the teachings of the present invention.
Figure 4:
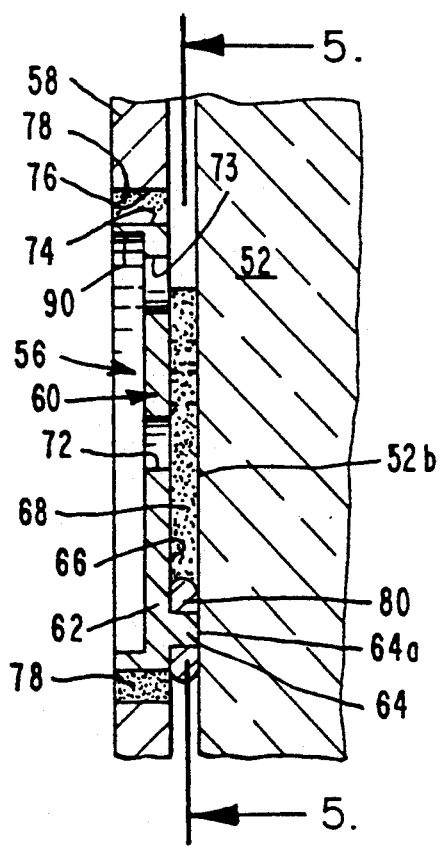
FIG. 4 is a view of the embodiment shown in FIG. 2 taken along line 4—4 thereof.
Figure 5:
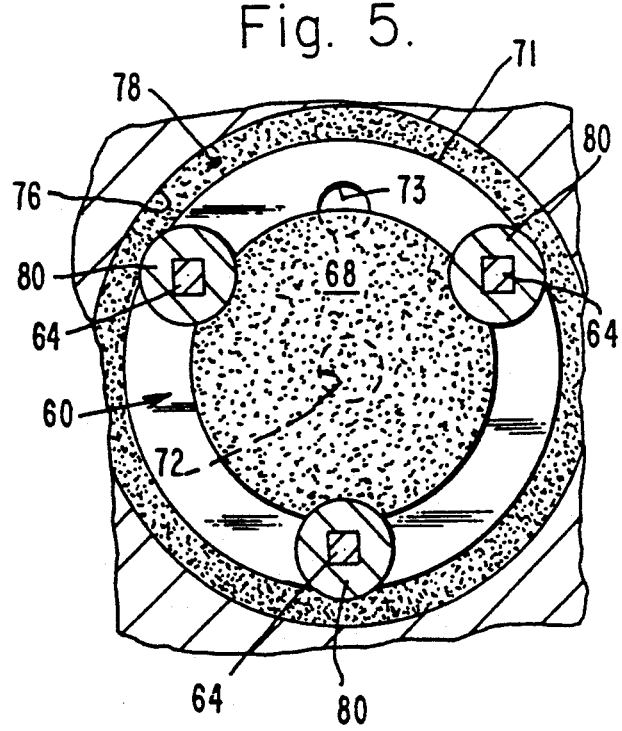
FIG. 5 is a view of the embodiment shown in FIG. 4 taken along line 5—5 thereof.

As shown in FIG. 1, an optics assembly 10 of an optical element or prism 12 is bonded to a support 14 by a rail assembly 16 as disclosed in U.S. Pat. No. 4,857,130. Rail assembly 16 comprises a pan 18 having a base 20 and rails 22 configured in a circular peripheral pattern or, if desired, three feet to provide an abutment rail top surface 24. A bonding space 26 is provided in pan 18 into which a bonding agent 28 is inserted to bond a side 30 of element 12 to base 20 of the pan. Bonding agent 28 shrinks upon curing to tightly cause element side 30 to firmly abut against top surface 24 of rails 22. Bonding agent 28 may be inserted through a fill hole 32. A witness hole 34 is provided for the purpose of visually establishing when sufficient bonding agent has been inserted, and to prevent any excess bonding material from being inserted beyond space 26.

Pan 18 is bonded to support 14 by means of a second bonding agent 36, such as a rigid epoxy, which cements the pan within a hole 38 formed in the support.

Rail assembly 16, therefore, acts as an adjustable plug between prism surface 30 and support 14, and rail assembly 16 is bonded to optical element 12 and in place within mating hole 38 in support 14.

As stated above, it was discovered that, when the materials of rail assembly 16 and optical element 12 have sufficiently different coefficients of thermal expansion, the rates of expansion or contraction upon heating or cooling cause the rail assembly to move a significantly greater distance than the optical element Thus, as shown in FIG. 1 upon a cooling for example to −70° F., rail 22 moves a larger distance as depicted by arrow 40 which has a large scalar value as compared to the smaller distance of optical element 12 as illustrated by arrow 42 of relatively small scalar value. Because of the attachment of rail 22 to optical element 2 by bonding agent 28 at their contacting surfaces at peripherally located points or edges 44a and 44b of top surface 24, pieces of the optical element are pulled from its side 30 adjacent to the periphery of top surface 24.

The invention, as disclosed with respect to a prism assembly 50 depicted in FIGS. 2–6, avoids this problem by providing a spacing means between the rails and the optical element, particularly at the peripheral edges, such as points 44a and 44b. As shown in FIG. 2, a pair of prisms 52 and 54 are placed so that their respective faces 52a and 54a are positioned adjacent to one another in proper optical alignment. To provide for such an optical alignment, a pair of rail assemblies 56, one on each side 52b and 54b respectively of prisms 52 and 54 (see also FIG. 4), are used to secure the prisms to supports 58. Only one set of configurations 56 per prism is shown in FIG. 2; similar sets secure other sides 52c and 54c to their respective support.

As best seen in FIGS. 3–6, each rail configuration 56 comprises a pan 60 having a base 62 and rails or feet 64, preferably three in number, configured in a circular peripheral pattern to provide an abutment rail top surface 64a for each rail. It is to be understood, however, that pan 60 may be of any configuration, and rails 64 may be curved or polygonally or otherwise configured, and continuous or segmented. Regardless of the specific configuration, a bonding space 66 is provided into which a bonding agent 68 is inserted to bond side 52b of element 52 to base 62 of the pan. As in U.S. Pat. No. 4,857,310, bonding agent 68 shrinks upon curing to cause element side 52b to firmly and tightly abut against top surface 64a of rails 64. Bonding agent 68 may be inserted through a fill hole 72 into bonding space 66 for flow slightly past rails 64, as visually seen by witness hole 73, but not to the annular space between periphery 74 of rail assembly 56 and hole 76 in support 58. This annular space is filled with a more rigid adhesive 78, when assembly 56, and its attached element 52, are affixed to support 58.

To prevent bonding agent 68 from forming a direct bond between rail 64 and adjacent to rail surfaces 64a and prism surface 52b, a spacing means 80, preferably configured as a donut, is placed about each rail or foot 64, as particularly depicted in FIG. 3. A preferred material for spacing means 80 is a polysulfide, which has a resilient characteristic and is capable of remaining resilient, especially at such a low temperature of −70° F. For the construction shown in FIG. 2, an epoxy or equivalent strong adhesive is needed as bonding agent 78, because it must have a greater adhesive capability than an adhesive of polysulfide, as well as a polyurethane adhesive, referred to in U.S. Pat. 4,857,310.

As illustrated in FIG. 3, the material of donut 80 can be cured prior to placement of rail assembly 56 on element 52, so that a portion of donut 80 will extend somewhat beyond the end of rail surface 64a. Thus, when rail assembly 56 is placed into contact with element surface 52b, donut 80 is compressed to seal against surface 52b and rail 64. In a preferred alternate approach, the material of donut 80 is placed about rails 64 in an uncured condition, and then cured after assembly 56 is placed in contact with element 52. The uncured tacky donut material will adhere to element surface 52b as well as to rails 64, to provide an improved seal over that established by compression alone. Therefore, when bonding agent 68 is inserted through fill hole 72, donut 80 ensures that rails 64 are prevented from establishing any contact with the bonding agent and, accordingly, is prevented from effecting a deleterious bond adjacent to the contacting peripheral points of surfaces 52b and 64a.

Rail assembly 56 is further configured to provide base 62 with a somewhat thin thickness and, therefore, to effect a relief 90 in the rail assembly, so that any stresses due to the contraction of the bonding agent will cause a bending of base 62 rather than an excessive pull on optical element 52 or 54.

Rail configuration 56, therefore acts as an adjustable plug between prism surfaces 52b and 52c and surfaces 54b and 54c on the one hand and support wall 58 on the other, and rail assemblies 56 are bonded both to optical element 52 of 54 and in place within mating hole 76 in support 58 without exerting damaging stresses or fractures on either optical element.

Although the invention has been described with respect to a particular embodiment thereof, it should be realized that various changes and modifications may be made therein without departing from the spirit and scope of the invention.

What is claimed is:

1. In a rail assembly, which secures an optical element to a support, and which includes (1) means defining at least one rail having a surface in contact with the optical element and (2) a resilient bonding agent, having the property of shrinking upon curing, that bonds the optical element to the support and that pulls the element securely against the rail means under tension, the improvement in bonding the optical element to the support through the rail means without damage to the optical element when the materials of the rail means and the optical element have different coefficients of thermal expansion, comprising:
resilient material means for spacing the bonding agent from the rail surface immediately in contact with the optical element.

2. The improvement according to claim 1 in which said resilient material spacing means comprises resilient material placed about each rail of the rail means.

3. The improvement according to claim 2 in which said resilient material spacing means, prior to the bonding and pulling of the optical element against the rail means, is configured to extend beyond the surface of each rail of the rail means and, after the bonding and pulling, to be sealed against the optical element and the rail means.

4. The improvement according to claim 3 in which said resilient material spacing means comprises a cured material in which the seal against the optical element is a compression seal.

5. The improvement according t claim 3 in which said resilient material spacing means comprises an tacky material to enable the seal again optical element to be an adhesive seal.

6. The improvement according to claim 2 in which said resilient material spacing means is configured as a donut.

7. The improvement according to claim 2 wherein the rail assembly comprises aluminum and the optical element comprises glass, which are subject to such temperatures as −70° F., in which said resilient material spacing means comprises a polysulfide and the resilient bonding agent comprises an epoxy.

8. The improvement according to claim 1 further comprising means defining a relief on the rail assembly adjacent the rail means for causing any bending stresses incurred by the bonding agent to be applied to the rail assembly rather than to the optical element.

9. The improvement according to claim 1 in which the rail means comprises a pan having a base with each rail extending- therefrom and with the bonding agent bonding the optical element to the base, and further bonding agent bonding the pan to the support.

10. In an arrangement, for bonding an optical element at its sides to a pair of walls, which includes (a) a pair of pans, each having a base and means defining at least one rail extending therefrom into contact with the optical element, and (b) a resilient first bonding agent, having the property of shrinking upon curing, respectively bonding the optical element sides to the bases cf the pans and securely pulling the element sides against the rail means of the pans under tension of the agent and a second bonding agent bonding the pans respectively to the walls, the improvement comprising:
resilient material means for spacing the bonding agent from the contact of the rail means with the optical element for avoiding any damage to the optical element when the materials of the rail means and the optical element have different coefficients of thermal expansion.

11. The improvement according to claim 10 in which said resilient material spacing means comprises resilient material placed about each rail of the rail means.

12. The improvement according to claim 10 in which said resilient material spacing means, prior to the bonding and pulling of the optical element against the rail means, is configured to extend beyond the surface of each rail of the rail means and, after the bonding and pulling, to be compressed and sealed against the optical element and the rail means.

13. The improvement according to claim 10 in which said resilient material spacing means is configured as a donut.

14. The improvement according to claim 10 wherein the rail assembly comprises aluminum and the optical element comprises glass, which are subject to such temperatures as −70° F., in which said resilient material spacing means comprises a polysulfide and the resilient bonding agent comprises an epoxy.

15. The improvement according to claim 10 further comprising means defining a relief in the rail means for causing any bending- stresses incurred by the bonding agent to be applied to the rail means rather than to the optical element.

16. The improvement according to claim 10 in which each of the pans has an exterior configuration, and further comprising means defining openings in the walls generally configured as the pan configuration for enabling the pans to fit within the opening means and the element to be bonded to the walls regardless of whether the walls are parallel to one another.

17. The improvement according to claim 10, for bonding the optical element to second optical element at their respective sides to a pair of walls and thereby for positioning one with respect to the other, in which is included (a) a second pair of pans, each having a base and means defining at least one rail extending therefrom in contact with the second optical element, and (b) a resilient bonding agent, having the property of shrinking upon curing, respectively bonding the second optical element sides to the base of the second pair of pans and securely pulling the second element sides against the rail means of the second pair of pans under tension of the agent and bonding the pans respectively to the walls.

18. A method for bonding an optical element to a support comprising the steps of:
    forming means defining at least one rail having a surface in contact with the optical element;
    bonding the optical element to the support by a resilient bonding agent having the property of shrinking upon curing for securely pulling the element under tension of the agent against the surface of the rail means; and
    spacing the bonding agent from the surface adjacent its contact with the optical element with resilient material for avoiding any damage to the optical element when the materials of the rail means and the optical element have different coefficients of thermal expansion.

19. A method according to claim 18 further comprising the steps of forming a bonding space between the rails of the rail means defined at least by the height of the rails and the separation therebetween.

20. A method according to claim 18 in which said rail means forming step comprises the steps of utilizing a pan having a base with the rails of the rail means extending therefrom and relieving the pan bases adjacent the rails for causing any bending stresses incurred by the bonding agent to be applied to the pans rather than to the optical elements.

21. A method according to claim 18 in which said spacing step comprises the steps of placing resilient material about each rail of the rail means, and selecting the resilient material to have a characteristic which permits it to remain resilient in the environment in which the optical element is placed.

22. A method according to claim 21 further comprising the step, prior to the steps of bondinq and pulling of the optical element against the rail means, of configuring the resilient material to extend beyond the surface of each rail of the rail means and, after the bonding and pulling steps, to be compressed and sealed against the optical element and the rail means.

23. A method according to claim 21 further comprising the step of configuring the resilient material as a donut.

* * * * *